United States Patent [19]
Ohtomi

[11] Patent Number: 4,842,806
[45] Date of Patent: Jun. 27, 1989

[54] DEVICE FOR MEASURING RECIRCULATING FLOW RATE IN A NUCLEAR REACTOR

[75] Inventor: Koichi Ohtomi, Kawasaki, Japan

[73] Assignee: Kabushiki Kaisha Toshiba, Kawasaki, Japan

[21] Appl. No.: 93,560

[22] Filed: Sep. 8, 1987

[30] Foreign Application Priority Data

Sep. 16, 1986 [JP] Japan ................................ 61-217798

[51] Int. Cl.$^4$ ........................................ G21D 1/00
[52] U.S. Cl. .................................. 376/247; 73/861.52
[58] Field of Search ............................. 73/195, 861.52; 376/246, 247, 377, 399

[56] References Cited

U.S. PATENT DOCUMENTS

| | | | |
|---|---|---|---|
| 3,071,160 | 1/1963 | Weichrod | 73/861.52 |
| 3,838,598 | 10/1974 | Tompkins | 73/861.52 |
| 3,840,051 | 10/1974 | Akashi et al. | 73/861.52 |
| 4,315,800 | 2/1982 | Yoshimoto et al. | 376/246 |
| 4,422,340 | 12/1983 | Kolodzey et al. | 376/246 |
| 4,662,219 | 5/1987 | Nguyen | 73/861.52 |

FOREIGN PATENT DOCUMENTS 55-144594 11/1980 Japan .

Primary Examiner—Deborah L. Kyle
Assistant Examiner—Richard W. Wendtland
Attorney, Agent, or Firm—Foley & Lardner, Schwartz, Jeffery, Schwaab, Mack, Blumenthal & Evans

[57] ABSTRACT

The recirculating flow rate of the primary coolant recirculated a nuclear reactor pressure vessel by an internal pump disposed therein is measured by a device which comprises a flow passage resisting device located in the recirculating flow passage of the primary coolant for creating between the upstream and downstream sides thereof a pressure difference in the primary coolant flow and detectors disposed at the upstream and downstream sides of the flow passage resisting device to detect the pressure difference therebetween. The thus detected pressure difference is converted into a corresponding electric signal by a transmitter which then transmits the signal to a device for computing the recirculating flow rate of the primary coolant in response to the signal. The device may further comprise an auxiliary measuring device for measuring a core flow rate of the primary coolant in a manner similar to that in the pumping flow rate measurement described above.

2 Claims, 3 Drawing Sheets

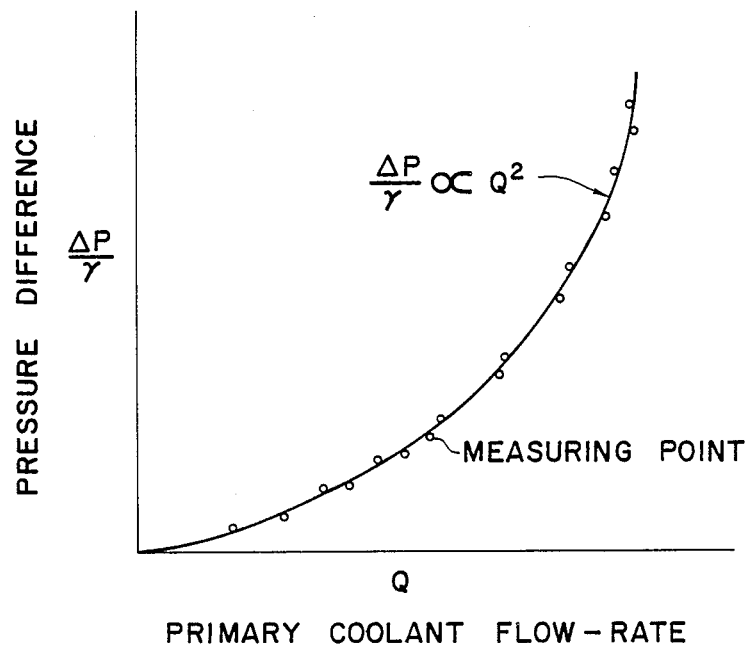
F I G. 3

DEVICE FOR MEASURING RECIRCULATING FLOW RATE IN A NUCLEAR REACTOR

BACKGROUND OF THE INVENTION

This invention relates to a device for measuring the recirulating flow rate of the primary coolant (reactor coolant) in a boiling water reactor (BWR) in which an internal pump is installed on the bottom of a reactor pressure vessel (called hereinafter an internal pump type reactor), particularly for measuring the flow rate of the primary coolant precisely and easily.

In one typical example of a known device for measuring primary coolant recirculating flow rate of a BWR, differential pressure detectors are installed on the upstream and downstream sides of a core support plate which supports a fuel assembly in the reactor, and the pressure difference caused by the core support plate is detected by a pressure difference transmitter as a pressure difference at the core support plate thereby to measure the recirculating flow rate (core flow rate). In the recirculating flow rate measuring device of this prior type, the core support plate constitutes a flow path resistance, and the flow rate is obtained or calculated from the pressure difference between the upstream side and the downstream side of the core support plate.

With a device of the type described above, however, since the pressure difference at the core support plate is measured as a pressure including a pressure difference in the interior of the fuel assembly, when two phase flow conditions of the liquid phase and the gas phase in the fuel assembly vary in accordance with the reactor output, the resisting value also varies, and accordingly, the flow rate cannot be exactly measured.

In another recirculating flow rate measuring device which has been proposed in this field, differential pressure detectors are located on the upstream and downstream sides of an internal pump to detect the pressure difference caused by the location of the internal pump by a pressure difference transmitter as a pressure difference at the internal pump, and in which the rotational speed of the internal pump is detected by a pulse converter. The recirculating flow rate (pump flow rate) is then measured by the combination of the pressure difference at the internal pump and the rotational speed thereof.

With the flow rate measuring device of the latter mentioned type, however, it is generally necessary to preliminarily determine the relationship between the pressure difference at the internal pump and the rotational speed thereof and the flow rate, but this relationship is often different with the internal pump used. Moreover, even with the same internal pump, the relationship for determining the flow rate may be different depending on the operational conditions thereof. Furthermore, with a device of this character, since the pressure difference at the internal pump and the rotational speed thereof are taken as factors to be inputted, the construction of the device is made complicated, and the accurate measuring of the flow rate cannot be attained.

As still another recirculating flow rate device, the prior art provides another type in which a flow meter of general type such as a Venturi tube is installed in the reactor (for example, refer to Japanese Patent Laid-Open Publication No. 144594/1980), but a device of this type involves drawbacks of complicated structure and increasing of the flow resistance of the primary coolant.

SUMMARY OF THE INVENTION

An object of this invention is to overcome the problems encountered in the prior art technique and to provide a device of simple construction for accurately measuring the recirculating flow rate of the primary coolant in a nuclear reactor.

Another object of this invention is to provide a device for measuring the recirculating flow rate of the primary coolant recirculated in a reactor pressure vessel by an internal pump, the device comprising, in specific combination, flow path resistance means, differential pressure detectors, a differential pressure transmitter, and a flow rate computing device.

A further object of this invention is to provide a recirculating flow rate measuring device additionally provided with an auxiliary equipment for measuring the recirculating flow rate of the primary coolant in a reactor core.

These and other objects can be attained according to this invention by providing a device for measuring the recirculating flow rate of the primary coolant recirculating in a reactor pressure vessel by means of an internal pump located at the bottom of the reactor pressure vessel, the device comprising a flow path resistance means disposed in the recirculating flow path of the primary coolant in the reactor pressure vessel and adapted to cause a pressure difference between an upstream part and a downstream part of the primary coolant caused to flow at constant flow rate, detectors positioned at an upstream position and a downstream position of the flow path resistance means so as to detect the pressure difference between the upstream and downstream positions of the primary coolant flow, a transmitter operatively connected to the detectors for converting the pressure difference value into an electric signal representing the pressure difference and transmitting the thus converted signal, and a device operatively connected to the transmitter for computing the recirculating flow rate of the primary coolant in response to the signal from the transmitter.

In a preferred embodiment of the invention, the flow passage resisting means comprises a plurality of support legs which are disposed between the bottom of the reactor pressure vessel and a lower end of a cylindrical shroud disposed within the reactor pressure vessel to partition the interior thereof and adapted to support the lower end of the shroud, and the differential pressure detectors are installed respectively at the upstream and downstream sides of the shroud support legs which are interposed therebetween.

In one modification of the preferred embodiment of the invention, the flow path resistance means comprises a rectifying lattice positioned at an upstream position of the internal pump and adapted to rectify the suction flow of the internal pump, and the differential pressure detectors are disposed respectively at the upstream and downstream sides of the rectifying lattice which is interposed therebetween.

Furthermore, in another preferred embodiment of the invention, the device further comprises an auxiliary measuring means for measuring the core flow rate of the primary coolant, the auxiliary measuring means comprising detectors disposed at upstream and downstream sides of a core support plate and adapted to detect the pressure difference of the primary coolant therebetween, a transmitter operatively connected to the detector and adapted to convert the detected pressure difference value into an electric signal and transmitting the thus converted signal, and a device operatively connected to the transmitter and adapted to compute the core flow rate in response to the signal from the transmitter.

These and other objects, features, and advantages of this invention will become clear from the following description of the preferred embodiments taken in conjunction with the accompanying drawings.

BRIEF DESCRIPTION OF THE DRAWINGS

In the accompanying drawings:

FIG. 3 is a graph representing the relationship between the pressure difference between the upstream and downstream sides of a flow path resistance means and the flow rate of the primary coolant.

DESCRIPTION OF THE PREFERRED EMBODIMENTS

Figure 1:
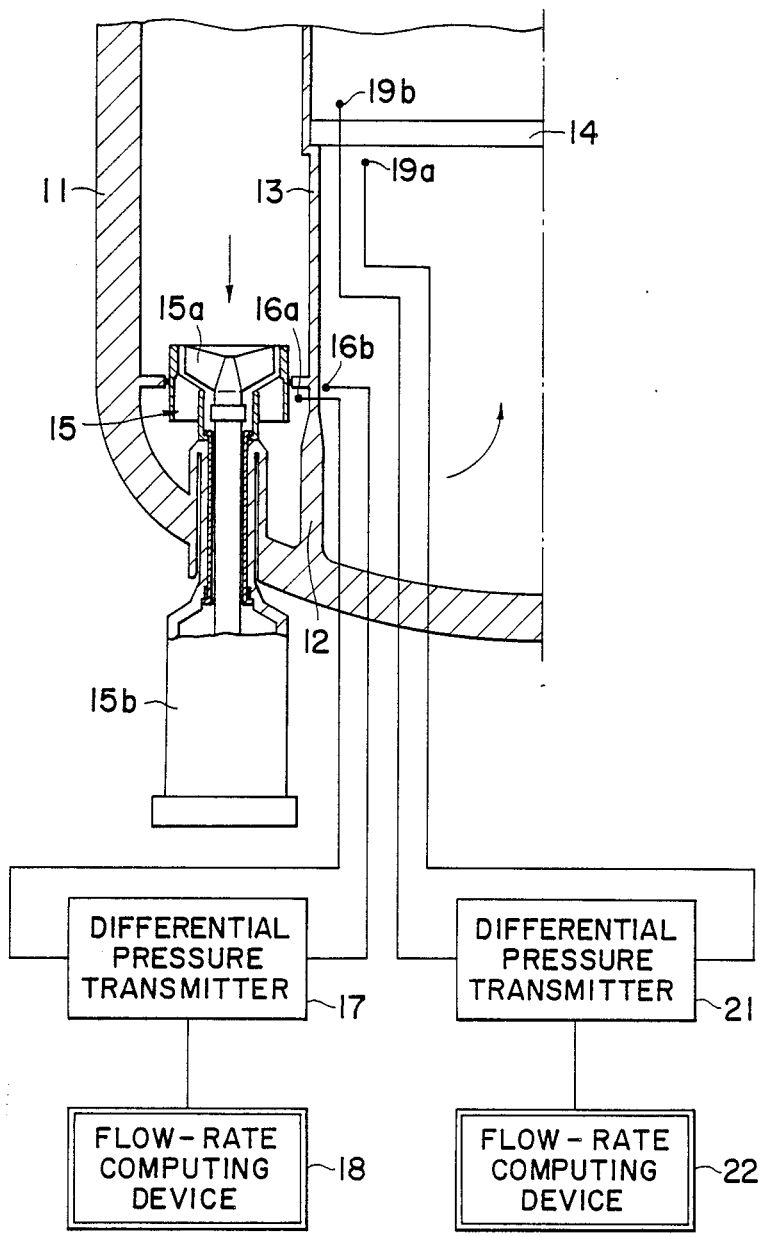
FIG. 1 is a partial elevation, in vertical section combined with a block diagram, of a recirculating flow rate measuring device according to one embodiment of this invention in an installed state in a reactor pressure vessel.

Referring to FIG. 1, the space in a reactor pressure vessel 11 is divided into inner and outer spaces by a cylindrical shroud 13 supported at the lower end thereof by a plurality of shroud support legs 12, and a fuel assembly, not shown, constituting a reactor core is arranged in the inner space which is inside the shroud 13. The fuel assembly is supported by a core support plate 14. A plurality of internal pumps 15, each provided with impellers 15a and a motor 15b for driving the impeller 15a in rotation are mounted at the bottom portion of the pressure vessel 11 which is outside the shroud 13. A primary coolant (reactor coolant) is recirculated in the pressure vessel 11 in the directions shown by arrows in FIG. 1 by the operation of the internal pumps 15.

The shroud support legs 12 are disposed at a plurality of spaced apart positions between the lower end of the shroud 13 and the bottom portion of the pressure vessel 11 thereby to support the lower portion of the shroud 13, thus improving the earthquake-proof strength of the shroud.

The primary coolant flows through the spaces between the respectively adjacent shroud support legs 12 towards the reactor core.

Differential pressure detectors 16a and 16b provided with pressure receiving surfaces are provided, respectively, on the upstream and downstream sides of the shroud support legs 12. The differential pressure detectors 16a and 16b are operatively connected to a pressure difference transmitter 17 which detects any pressure difference caused by the shroud support legs 12 as the pressure difference at the shroud support leg, converts this pressure difference value into an electrical signal representing the pressure difference and outputs the thus obtained signal. The outputted signal from the pressure difference transmitter 17 is inputted into a flow rate computing means 18 which thereupon computes the recirculating flow rate (pumping flow rate).

The other differential pressure detectors 19a and 19b are respectively positioned at upstream and downstream positions of the core support plate 14 to detect the pressure difference caused by the core support plate 14 as a pressure difference at the core support plate. The differential pressure detectors 19a and 19b are operatively connected to a pressure difference transmitter 21 which converts the detected pressure difference value into a signal representing the pressure differencee at the core support plate and then outputs the thus obtained signal. The electric output signal generated from the pressure difference transmitter 21 is inputted into a flow rate computing means 22 in which the recirculated flow rate (core flow rate) can be computed. The recirculating flow rate measuring device of the organization described above for measuring the core flow rate is installed for the purpose of attaining an auxiliary function of the recirculating flow rate measuring device for measuring the pumping flow rate.

The circulating flow rate measuring device of the organization described hereinbefore operates as follows.

When the internal pump 15 operates, the primary coolant flows in the pressure vessel 11 in the arrow direction. At this time, the shroud support legs 12 act as flow path resistance means thereby to create the pressure difference between the upstream and downstream positions of the shroud support legs 12. The pressure difference is detected by the pressure difference detectors 16a and 16b, and the detected values are converted by the pressure difference transmitter 17 into the electric signals representing the pressure differences. The converted signals are inputted into the flow rate computing means 18 in which the recirculating flow rate of the primary coolant is computed and measured. During these operations, since the shroud support legs 12 are located at positions apart from the fuel assembly, not shown, constituting the reactor core, the primary coolant passing through the respective shroud support legs 12 constitutes a single phase, i.e., a liquid phase, whereby the coolant flow is evenly maintained. In addition, in such a case, it is experimentally found that the relationship between the pressure difference between the upstream and downstream positions of the flow resistance and the flow rate passing these positions is maintained constant.

In other words, as shown in FIG. 3, the relationship between the flow rate and the pressure difference is represented by the following equation.

$$Q = a\sqrt{\frac{\Delta p}{\gamma}} \qquad (1)$$

in which: Q designates the flow rate; $\Delta p$ is the pressure difference; $\gamma$ is the specific gravity of the fluid; and $a$ is the coefficient of flow rate. The coefficient $a$ is experimentally known to be constant with no relation to the operational conditions of the reactor and the individual characteristics of the internal pumps used.

As described above, according to this embodiment of the invention, the recirculating flow rate (pumping flow rate) of the primary coolant can be measured easily and accurately merely by measuring the pressure difference of the primary coolant between the upstream and downstream sides as it passes in liquid phase between the respective shroud support legs 12. In addition, the flow rate measurement can be performed more accurately by combined use of a recirculating flow rate measuring device which measures the flow rate passing the reactor core.

Figure 2:
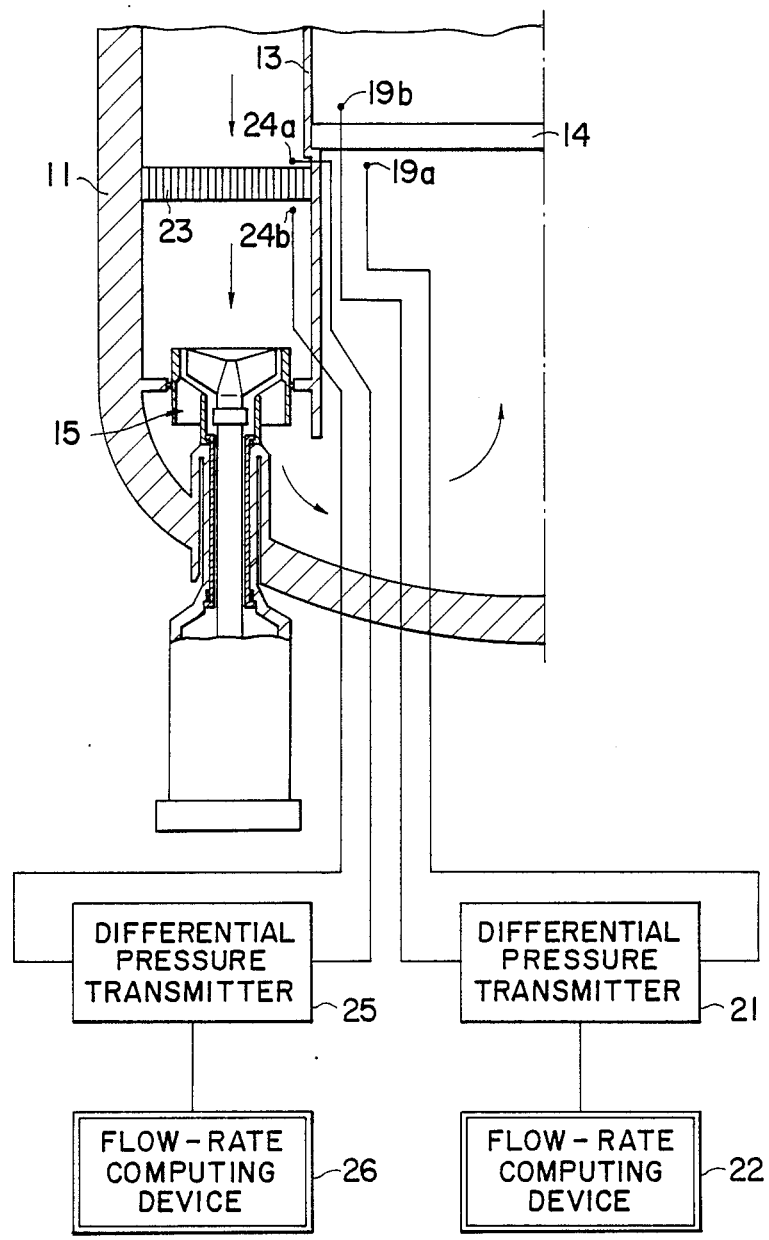
FIG. 2 is a similar elevation and block diagram of a recirculating flow rate measuring device according to another embodiment of this invention.

FIG. 2 is a vertical sectional view of another embodiment of the recirculating flow rate measuring apparatus according to this invention, in which a rectifying lattice 23 adapted to rectify the suction flow of the internal pump 15 is installed between the pressure vessel 11 and the shroud 13 on the upstream side of the internal pump 15. The rectifying lattice 23 is constituted by combining, in the form of a lattice, fine elongated plate members, by a flat plate with a number of perforations, or by a combination of the members of these two types.

Differential pressure detectors 24a and 24b are disposed at positions on the upstream and downstream sides of the rectifying lattice 23 disposed therebetween to detect the pressure difference between the upstream and downstream sides of the rectifying lattice 23 caused thereby. The differential pressure detectors 24a and 24b are operatively connected to a pressure difference transmitter 25 which converts the detected pressure difference into an electrical signal which is then outputted therefrom. The pressure difference transmitter 25 is further connected to a flow rate computing means 26 which computes the recirculating flow rate (pumping flow rate) in response to the transmitted electric signal representing the pressure difference.

Similarly as in the preceding embodiment of the invention, the recirculating flow rate measuring device accomplishes an auxiliary function, being provided with pressure detectors 19a and 19b disposed at upstream and downstream positions of the core support plate 14 so as to detect the pressure difference caused thereby, a pressure difference transmitter 21 for converting the detected pressure difference into an electrical signal, and a flow rate computing means 22 for computing the core flow rate.

As described hereinbefore, according to this embodiment of the invention, since the rectifying lattice 23 is positioned apart from the fuel assembly (not shown) constituting the reactor core, and the primary coolant passing through the rectifying lattice 23 constitutes a single phase, i.e., a liquid phase, a relationship as shown in FIG. 3 is established between the pressure difference and the flow rate, and the relationship represented by the equation (1) is also applicable. The recirculating flow rate (pumping flow rate) can thus be measured easily and accurately merely by measuring the pressure difference of the primary coolant in the liquid phase between the upstream and downstream sides of the rectifying lattice 23.

As will be understood from the foregoing description with respect to preferred embodiments of this invention, since the position of the flow passage resisting means in the recirculating flow path of the primary coolant in a reactor pressure vessel causes a pressure difference of the primary coolant between the upstream and downstream sides of the flow resisting means, the relationship between the pressure difference and the flow rate can be determined constantly. Accordingly, the detection of this pressure difference makes possible easy and exact measurement of the recirculating flow rate of the primary coolant.

In another aspect, according to this invention, the shroud support legs or a rectifying lattice, which are ordinarily located in the reactor pressure vessel, are utilized as a flow passage resisting means, so that special members or equipment are not required additionally for measuring the flow rate of the primary coolant. Thus the measuring means is compact and easily installed in an existing nuclear reactor.

What is claimed is:

1. In a boiling water nuclear reactor having a reactor pressure vessel with a bottom, an internal recirculation pump mounted in said bottom of said vessel, said vessel being at least partially filled with a primary coolant, a reactor core disposed diagonally above said internal recirculation pump, and means for measuring the recirculation flow rate of said coolant, comprising:
   a flow passage resisting means disposed in a recirculating flow passage of the primary coolant in the reactor pressure vessel and adapted to cause, between an upstream side and a downstream side thereof, a pressure difference in the primary coolant while the flow of the primary coolant is maintained constant;
   means disposed at an upstream position and a downstream position relative to said flow passage resisting means for providing a first detecting means for detecting a value of said pressure difference;
   means operatively connected to said first detecting means for converting the detected pressure difference value into an electrical signal representing the pressure difference and transmitting the electrical signal; and
   means operatively connected to said transmitting means for computing the recirculating flow rate of the primary coolant in response to the electrical signal from said transmitting means;
   wherein said flow passage resisting means comprises a plurality of support legs which extend between the bottom of the reactor pressure vessel and a lower end part of a cylindrical shroud disposed within the reactor pressure vessel to partition the interior thereof and serving to support said lower end part of said shroud, and said differential pressure detecting means are disposed, respectively, at upstream and downstream sides of said shroud support legs which are interposed therebetween.

2. The apparatus according to claim 1 further comprising:
   an auxiliary measuring means for measuring a core flow rate of the primary coolant, said auxiliary measuring means comprising means located at upstream and downstream sides of a core support plate and adapted to provide a second detecting means to detect the pressure difference of the primary coolant therebetween;
   means operatively connected to said second detecting means and adapted to convert said detected pressure difference value into an electrical signal and transmitting the electrical signal; and
   means operatively connected to said transmitting means and operating to compute the core flow rate in response to the signal from said transmitting means.

* * * * *